US011565622B2

(12) United States Patent
Seitz

(10) Patent No.: US 11,565,622 B2
(45) Date of Patent: Jan. 31, 2023

(54) REAR CORNER POST FOR A TRUCK TRAILER

(71) Applicant: Strick Trailers, LLC, Fairless Hills, PA (US)

(72) Inventor: Kevin Seitz, Decatur, IN (US)

(73) Assignee: Strick Trailers, LLC, Fairless Hills, PA (US)

( * ) Notice: Subject to any disclaimer, the term of this patent is extended or adjusted under 35 U.S.C. 154(b) by 206 days.

(21) Appl. No.: 17/181,064

(22) Filed: Feb. 22, 2021

(65) Prior Publication Data

US 2021/0260975 A1    Aug. 26, 2021

Related U.S. Application Data

(60) Provisional application No. 62/980,161, filed on Feb. 22, 2020.

(51) Int. Cl.

| B60J 5/10 | (2006.01) |
|---|---|
| E05D 3/02 | (2006.01) |
| B60P 7/15 | (2006.01) |
| B62D 63/08 | (2006.01) |
| B62D 33/04 | (2006.01) |
| B60P 1/64 | (2006.01) |
| B62D 25/02 | (2006.01) |
| B60P 3/07 | (2006.01) |
| B60Q 1/50 | (2006.01) |
| B60P 1/44 | (2006.01) |
| B60P 1/00 | (2006.01) |

(52) U.S. Cl.
CPC ............... *B60P 7/15* (2013.01); *B60J 5/108* (2013.01); *B60P 1/00* (2013.01); *B60P 1/4464* (2013.01); *B60P 1/6409* (2013.01); *B60P 3/07* (2013.01); *B60Q 1/50* (2013.01); *B62D 25/02* (2013.01); *B62D 33/04* (2013.01); *B62D 33/046* (2013.01); *B62D 63/08* (2013.01); *E05D 3/02* (2013.01); *E05Y 2900/516* (2013.01); *E05Y 2900/531* (2013.01)

(58) Field of Classification Search
CPC .. B60P 7/15; B60P 1/6409; B60P 3/07; B60P 1/4464; B60P 1/00; B62D 63/08; B62D 33/04; B62D 25/02; B62D 33/046; B60J 5/108; E05D 3/02; B60Q 1/50; E05Y 2900/516; E05Y 2900/531
See application file for complete search history.

(56) References Cited

U.S. PATENT DOCUMENTS

| 2018/0191692 A1* | 7/2018 | Frank | H04L 63/0428 |
| 2018/0201336 A1* | 7/2018 | Mckeever | B62D 27/06 |

FOREIGN PATENT DOCUMENTS

| EP | 2949492 A1 * | 12/2015 | B60J 5/065 |
| EP | 3283355 B1 * | 10/2019 | B60J 5/0498 |

* cited by examiner

*Primary Examiner* — D Glenn Dayoan
*Assistant Examiner* — Melissa Ann Bonifazi
(74) *Attorney, Agent, or Firm* — George Pappas; Barrett McNagny LLP

(57) ABSTRACT

A corner post is for a rear door of a trailer, container or truck body. The corner post has a width when the door has been swung open 90 degrees between 0.75 inch and 1.94 inch such that the width of the opening into the trailer when both doors are open is at least 98.44 inches. The corner post includes three pieces that are attached together. The three pieces include planar sections and U-shaped sections.

20 Claims, 2 Drawing Sheets

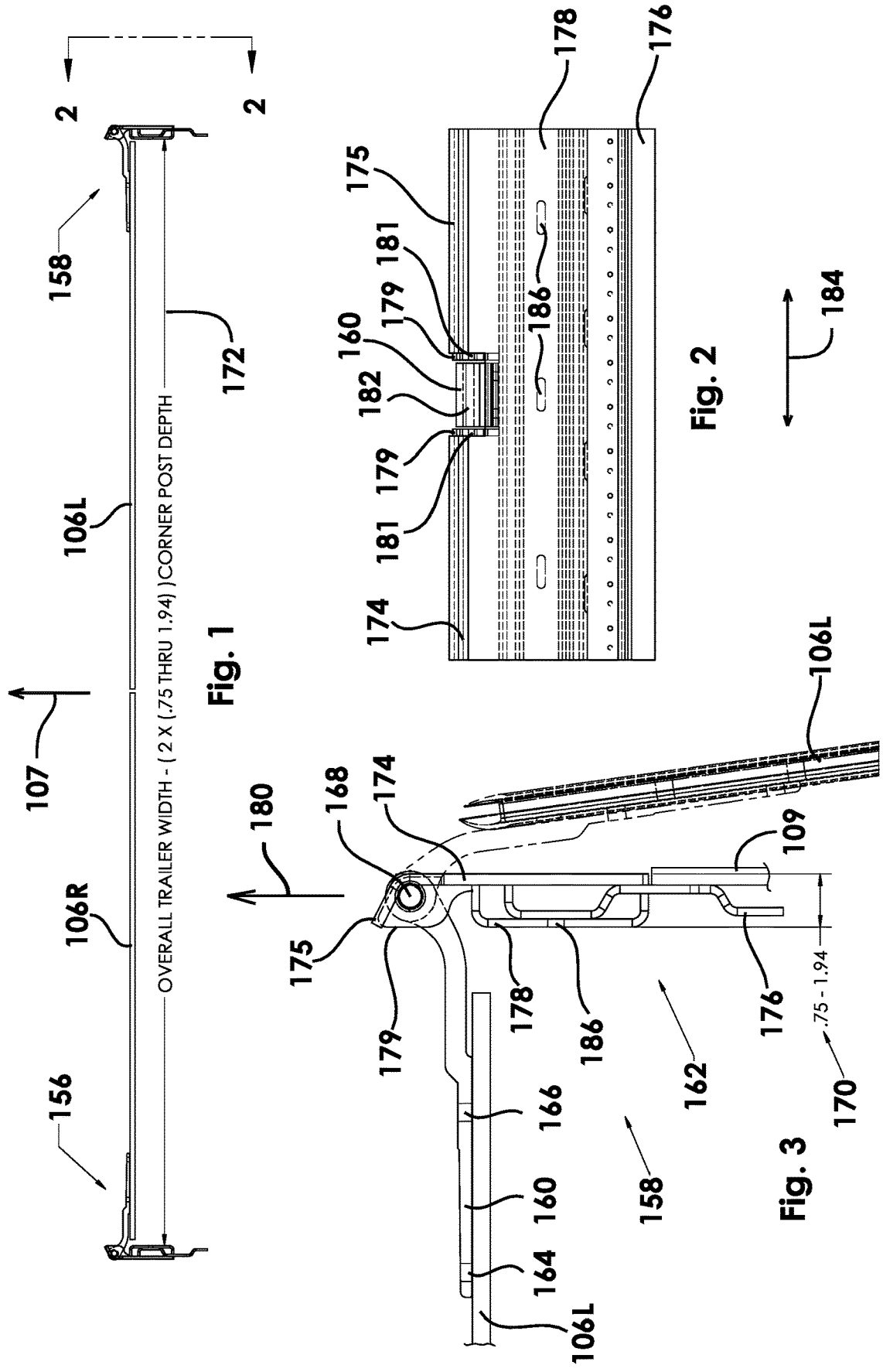

REAR CORNER POST FOR A TRUCK TRAILER

CROSS-REFERENCED TO RELATED APPLICATIONS

This application claims benefit of U.S. Provisional Application No. 62/980,161 filed on Feb. 22, 2020, the disclosure of which is hereby incorporated by reference in its entirety for all purposes.

SUMMARY

The present invention relates to a trailer, container, or other transport vehicle having rear swinging doors and a known door opening constraint which is limited by the two-inch widths of the corner posts on which the doors are hinged. The distance between the two corner posts may be about 98 $5/16^{th}$ inches, and this distance defines the width of the door opening and determines the maximum width of cargo that may be loaded onto the trailer. The external width of the trailer is limited by federal regulations, and thus it is not possible to increase the internal width of the trailer by moving the existing posts farther apart without a special permit.

In one embodiment, the corner posts at the two rear corners of the trailer each have a reduced width of 0.75 to 1.94 inch rather than the standard two inches to thereby yield a 100-inch door opening width when used in a 2.6-meter trailer, container or truck body application. Each corner post is pivotably coupled to a respective door that swings open. In order to achieve the same level of rigidity as the standard two-inch wide post, the corner posts each include three separate pieces that are welded together. A first piece is a formed steel plate of attached to the door hinge. A second piece is welded to an inner surface of the first piece. The second piece includes a U-shaped section having two distal ends each engaging and welded to the inner surface of the first piece. The second piece also includes a flat section parallel to, engaging and welded to the first piece. A rear end of the flat section is attached to a front distal end of the U-shaped section. A third piece is U-shaped and covers the U-shaped section of the second piece. A rear distal end of the third piece is welded to the inner surface of the first piece. A middle part of the third piece is welded to and lays flush against a middle part of the U-shaped section of the second piece. A front distal end of the third piece is welded to the inner surface of the flat section of the second piece. The reduced-width corner posts may particularly apply to a trailer, container or truck body having two swinging rear doors rather than a single overhead door.

The invention comprises, in another form thereof, a corner post for being hingedly coupled to a rear door of a trailer. The corner post includes a first piece including a planar body, a rear proximal end and a front distal end. The proximal end is coupled to a hinge coupling the corner post to the rear door. A second piece includes a substantially U-shaped portion having a planar mid-section with a rear end and a front end. The planar mid-section is substantially parallel to the planar body of the first piece. The substantially U-shaped portion also includes a first leg with a first end attached to the rear end of the planar mid-section and a second end attached to the planar body of the first piece. The substantially U-shaped portion further includes a second leg with a first end and a second end. The first end is attached to the front end of the planar mid-section. The second piece also includes a planar section with a rear end and a front end. The planar section is substantially parallel to the planar mid-section. The rear end of the planar section is attached to the second end of the second leg and to the front distal end of the first piece. A U-shaped third piece includes a planar middle section with a rear end and a front end. The planar middle section is substantially parallel to the planar body of the first piece. The planar middle section is attached to and abuts the planar mid-section of the second piece. The U-shaped third piece also includes a first leg with a first end attached to the rear end of the planar middle section and a second end attached to the rear proximal end of the first piece. The U-shaped third piece further includes a second leg with a first end and a second end. The first end is attached to the front end of the planar middle section. The second end is attached to the planar section of the second piece.

The invention comprises, in yet another form thereof, a corner post assembly for being attached to a swinging rear door of a trailer. The corner post assembly includes a hinge and a corner post having a substantially planar piece and a substantially U-shaped piece. The substantially planar piece includes a proximal end attached to the hinge. The substantially U-shaped piece has a planar mid-section, a first leg, and a second leg. The planar mid-section has a rear end and a front end. The planar mid-section is substantially parallel to the substantially planar piece. The first leg has a first end attached to the rear end of the planar mid-section and a second end attached to the substantially planar piece. The second leg has a first end and a second end. The first end of the second leg is attached to the front end of the planar mid-section. The second end of the second leg extends toward the substantially planar piece. A maximum width of the corner post is between an outer surface of the substantially planar piece and an outer surface of the planar mid-section of the substantially U-shaped piece. The maximum width is between 0.75 inch and 1.94 inch.

The invention comprises, in a further form thereof, a trailer including a lefthand hinge, a righthand hinge, two corner posts, and two rear doors. Each corner post includes a substantially planar piece including a proximal end attached to a respective one of the hinges. Each corner post also includes a substantially U-shaped piece having a planar mid-section with a rear end and a front end. The planar mid-section is substantially parallel to the substantially planar piece. The substantially U-shaped piece also includes a first leg with a first end attached to the rear end of the planar mid-section and a second end attached to the substantially planar piece. The substantially U-shaped piece further includes a second leg with a first end and a second end. The first end is attached to the front end of the planar mid-section. The second end extends toward the substantially planar piece. Each door is attached to a respective corner post through a respective hinge. Each rear door is pivotable about the respective hinge between a closed position in which each door is perpendicular to a longitudinal axis of the trailer, and an open position in which each door is rotated at least 90 degrees from the closed position. The doors block an entryway into an interior cargo space of the trailer in the closed position. The doors expose the entryway into the interior cargo space of the trailer in the open position. The entryway has a minimum clearance width in a lateral direction that is perpendicular to the longitudinal axis of the trailer. The minimum clearance width is at least 98.44 inches.

An advantage of the present invention is that the width of the rear door opening of the trailer may be as great as 100.88 inches when utilized in a 2.6-meter-wide trailer or truck body.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is an overhead view of two corner posts assemblies suitable for use in a trailer, container or truck body of the present invention;

FIG. 2 is a fragmentary left side view of one of the corner posts of FIG. 1 along line 2-2; and FIG. 3 is an enlarged overhead sectional view of one of the two corner posts assemblies of FIG. 1.

Figure 4:
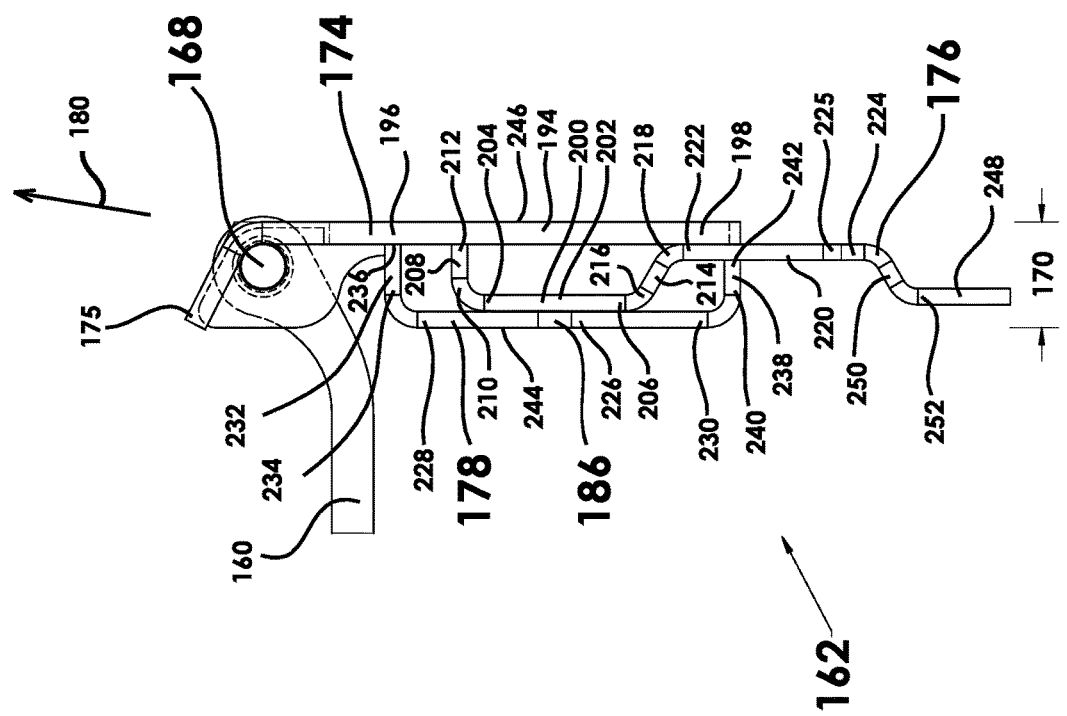
FIG. 4 is an enlarged overhead sectional view of the corner post of FIG. 3.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

FIG. 1 illustrates two corner posts assemblies 156, 158 of a trailer that are each attachable to a respective one of rear doors 106. Particularly, right side corner post assembly 156 is attached to rear door 106R, and left side corner post assembly 158 is attached to rear door 106L. A rearward direction of the trailer, container or truck body is indicated by arrow 107. Right side corner post assembly 156 may be a mirror image of left-side corner post assembly 158, and thus only left-side corner post assembly 158 is described in detail herein to avoid needless repetition.

FIG. 3 is an enlarged illustration of left-side corner post assembly 158 including a bracket 160 pivotably coupled to a corner post 162 that is attachable to a left side wall 109. Bracket 160 includes through holes 164, 166 through which bracket 160 may be attached to door 106L by mechanical fasteners (not shown). Bracket 160 is pivotally attached to corner post 162 via a hinge 168. Bracket 160 and door 106L may be swung approximately 250 degrees from the closed position shown in solid lines to the fully open position shown in dashed lines.

Corner post 162 has a reduced width of 0.75 to 1.94 inch as indicated at 170, rather than the standard two inches, to thereby yield a 100.88 inch door opening width in a 2.6-meter-wide trailer, container or truck body configuration as indicated at 172 in FIG. 1. That is, when doors 106L, 106R are in the open position, there is a minimum clearance width of 98.44 inches in a lateral direction perpendicular to a longitudinal axis of trailer 100 between the closest points on the two opposing corner posts. Thus, it is possible to insert any item with a width less than 98.44 inches into the trailer's interior cargo space.

Corner post 162 is attached to left side door 106L that swings open. In order to achieve the same level of rigidity as the standard two-inch wide post, corner post 162 includes three separate pieces 174, 176, 178 that are welded together. A first piece 174 is a formed plate of steel attached to door hinge 168 which defines a radially outward direction 180. A zig-zagging second piece 176 is welded to an inner surface of first piece 174. Second piece 176 includes a U-shaped section having two distal ends each engaging and welded to the inner surface of first piece 174. Second piece 176 also includes a flat section parallel to, engaging and welded to first piece 174. A rear end of the flat section is attached to a front distal end of the U-shaped section. Third piece 178 is U-shaped and covers the U-shaped section of second piece 176. A rear distal end of third piece 178 is welded to the inner surface of first piece 174. A middle part of third piece 178 is welded to and lays flush against a middle part of the U-shaped section of second piece 176. A front distal end of third piece 178 is welded to the inner surface of the flat section of second piece 176.

The reduced-width corner posts may or may not be used in conjunction with a trailer that may be loaded and unloaded at curb-level. However, the reduced-width corner posts may particularly apply to a trailer having two swinging rear doors rather than a single overhead door.

FIG. 2 illustrates corner post 162 along line 2-2 of FIG. 1. First piece 174 includes notches 182 intermittently along its length (length being defined in directions 184) that define channels for retaining an elongate, cylindrical hinge pin (not shown) within the channels.

Third piece 178 includes oval through holes 186 through which third piece 178 may be welded to second piece 176. First piece 174, second piece 176 and third piece 178 may all be made of steel or another metal and may be attached together via welding. A fourth piece 179 includes through holes 181 through which hinge 168 connects to bracket 160.

FIG. 4 is an enlarged illustration of corner post 162 for rear door 106L of the trailer. Hinge 168 defines radially outward direction 180. First piece 174 includes a rear tip 175 and a planar body 194 having a rear proximal end 196 and a front distal end 198. Fourth piece 179 is connected to the planar body 194 and to rear tip 175. Fourth piece 179 is coupled to hinge 168. Second piece 176 includes a substantially U-shaped portion 200 having a planar mid-section 202 with a rear end 204 and a front end 206. Planar mid-section 202 is parallel to planar body 194 of first piece 174. U-shaped portion 200 includes a first leg 208 with a first end 210 attached to rear end 204 of planar mid-section 202 and a second end 212 attached to planar body 194 of first piece 174. U-shaped portion 200 includes a second leg 214 with a first end 216 and a second end 218. First end 216 is attached to front end 206 of planar mid-section 202. Second piece 176 includes a planar section 220 with a rear end 222 and a front end 224. Planar section 220 includes through-holes 225 through which second piece 176 may be attached to left side wall 109, such as by bolts or rivets. Planar section 220 is parallel to planar mid-section 202 of U-shaped portion 200. Rear end 222 of planar section 220 is attached to second end 218 of second leg 214 and to front distal end 198 of first piece 174. U-shaped third piece 178 includes a planar middle section 226 with a rear end 228 and a front end 230. Planar middle section 226 is parallel to planar body 194 of first piece 174. Planar middle section 226 is attached to and abuts the planar mid-section 202 of second piece 176. U-shaped third piece 178 includes a first leg 232 with a first end 234 attached to rear end 228 of planar middle section 226 and a second end 236 attached to rear proximal end 196 of first piece 174. U-shaped third piece 178 includes a second leg 238 with a first end 240 and a second end 242. First end 240 of second leg 238 is attached to front end 230 of planar middle section 226. Second end 242 of second leg 238 is attached to planar section 220 of second piece 176. A width 170 of post 162 between an outer surface 244 of third piece 178 and an outer surface 246 of first piece 174 is between 0.75 inch and 1.94 inch.

A distal end of second piece 176 is bent so as to have a second planar section 248 that may be parallel to, but offset from, both first piece 174 and the middle portion of third piece 178. Second planar section 248 is non-coplanar with the first planar section 220 and coplanar with planar mid-section 202 of U-shaped portion 200. A connecting segment 250 connects front end 224 of first planar section 220 to a rear end 252 of second planar section 248.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention may be applied to a trailer, container or truck body. Trailers, containers or truck bodies may be conjunctively referred to herein as "transportation vessels".

What is claimed is:

1. A corner post for being hingedly coupled to a rear door of a trailer, the corner post comprising:
    a first piece including a planar body, a rear proximal end and a front distal end, the proximal end being configured to be coupled to a hinge coupling the corner post to the rear door;
    a second piece including:
        a substantially U-shaped portion having:
            a planar mid-section with a rear end and a front end, the planar mid-section being substantially parallel to the planar body of the first piece;
            a first leg with a first end attached to the rear end of the planar mid-section and a second end attached to the planar body of the first piece; and
            a second leg with a first end and a second end, the first end attached to the front end of the planar mid-section; and
        a planar section with a rear end and a front end, the planar section being substantially parallel to the planar mid-section, the rear end being attached to the second end of the second leg and to the front distal end of the first piece; and
    a U-shaped third piece including:
        a planar middle section with a rear end and a front end, the planar middle section being substantially parallel to the planar body of the first piece, the planar middle section being attached to and abutting the planar mid-section of the second piece;
        a first leg with a first end attached to the rear end of the planar middle section and a second end attached to the rear proximal end of the first piece; and
        a second leg with a first end and a second end, the first end being attached to the front end of the planar middle section, the second end being attached to the planar section of the second piece.

2. The corner post of claim 1 wherein a width of the corner post between an outer surface of the planar body of the first piece and an outer surface of the planar mid-section of the substantially U-shaped portion of the second piece is between 0.75 inch and 1.94 inch.

3. The corner post of claim 1 wherein the planar section of the second piece comprises a first planar section, the second piece including:
    a second planar section that is non-coplanar with the first planar section; and
    a connecting segment connecting the front end of the first planar section to a rear end of the second planar section.

4. The corner post of claim 3 wherein the second planar section is coplanar with the planar mid-section of the substantially U-shaped portion of the second piece.

5. The corner post of claim 1 wherein the planar middle section of the U-shaped third piece includes a plurality of through holes through which the third piece may be welded to the second piece.

6. The corner post of claim 1 wherein the first piece includes a plurality of notches spaced along a height of the first piece, the corner post further comprising a plurality of fourth pieces associated with corresponding said notches for coupling the corner post to the hinge.

7. The corner post of claim 1 wherein the second leg of the substantially U-shaped portion of the second piece is oriented at an angle approximately between 45 degrees and 75 degrees relative to the planar mid-section of the substantially U-shaped portion and relative to the planar section of the second piece.

8. A corner post assembly for being attached to a swinging rear door of a trailer, the corner post assembly comprising:
    a hinge; and
    a corner post including:
        a substantially planar piece including a proximal end attached to the hinge; and
        a substantially U-shaped piece having:
            a planar middle section with a rear end and a front outer end, the planar middle section being substantially parallel to the substantially planar piece;
            a first leg with a first end attached to the rear end of the planar middle section and a second end attached to the substantially planar piece; and
            a second leg with a first end and a second end, the first end attached to the front end of the planar middle section, the second end extending toward the substantially planar piece, a maximum width of the corner post being between an outer surface of the substantially planar piece and an outer surface of the planar middle section of the substantially U-shaped piece, the maximum width being between 0.75 inch and 1.94 inch.

9. The corner post assembly of claim 8 further comprising a zig-zagging piece including a first planar section partially disposed between a distal end of the substantially planar piece and the second end of the second leg of the substantially U-shaped piece.

10. The corner post assembly of claim 9, wherein the zig-zagging piece includes:
    a second planar section that is non-coplanar with the first planar section; and
    a connecting segment connecting the front end of the first planar section to a rear end of the second planar section.

11. The corner post assembly of claim 10 wherein the zig-zagging piece includes a substantially U-shaped portion having a planar mid-section, the second planar section being coplanar with the planar mid-section of the substantially U-shaped portion.

12. The corner post assembly of claim 9 wherein the U-shaped piece includes a plurality of through holes through which the U-shaped piece may be welded to the zig-zagging piece.

13. The corner post assembly of claim 12 wherein the through holes are in the planar middle section of the U-shaped piece.

14. The corner post assembly of claim 10 wherein the connecting segment of the zig-zagging piece is oriented at an angle approximately between 45 degrees and 75 degrees relative to the first planar section and relative to the second planar section.

15. A transportation vessel comprising:
a lefthand hinge;
a righthand hinge;
two corner posts, each said corner post including:
   a substantially planar piece including a proximal end attached to a respective one of the hinges; and
   a substantially U-shaped piece having:
      a planar mid-section with a rear end and a front end, the planar mid-section being substantially parallel to the substantially planar piece;
      a first leg with a first end attached to the rear end of the planar mid-section and a second end attached to the substantially planar piece; and
      a second leg with a first end and a second end, the first end attached to the front end of the planar mid-section, the second end extending toward the substantially planar piece; and
two rear doors, each said door being attached to a respective said corner post through a respective said hinge, each said rear door being pivotable about the respective said hinge between a closed position in which each said door is perpendicular to a longitudinal axis of the trailer, and an open position in which each said door is rotated at least 90 degrees from the closed position, the doors blocking an entryway into an interior cargo space of the trailer in the closed position, the doors exposing the entryway into the interior cargo space of the trailer in the open position, the entryway having a minimum clearance width in a lateral direction that is perpendicular to the longitudinal axis of the trailer, the minimum clearance width being at least 98.44 inches.

16. The trailer of claim 15, wherein each said corner post has a maximum width between an outer surface of the substantially planar piece and an outer surface of the planar mid-section of the substantially U-shaped piece, the maximum width being between 0.75 inch and 1.94 inch.

17. The trailer of claim 15 further comprising a zig-zagging piece including a first planar section partially disposed between a distal end of the substantially planar piece and the second end of the second leg of the substantially U-shaped piece.

18. The trailer of claim 17, wherein the zig-zagging piece includes:
a second planar section that is non-coplanar with the first planar section; and
a connecting segment connecting the front end of the first planar section to a rear end of the second planar section.

19. The trailer of claim 18 wherein the zig-zagging piece includes a substantially U-shaped portion having a planar mid-section, the second planar section being coplanar with the planar mid-section of the substantially U-shaped portion.

20. The trailer of claim 18 wherein the connecting segment of the zig-zagging piece is oriented at an angle approximately between 45 degrees and 75 degrees relative to the first planar section and relative to the second planar section.

* * * * *